United States Patent [19]

Bergers et al.

[11] Patent Number: 5,310,276
[45] Date of Patent: May 10, 1994

[54] CONNECTION DEVICE BETWEEN TWO MECHANICAL COMPONENTS

[75] Inventors: Jeffrey L. Bergers, Grand Rapids; Terry L. Houston, Walker, both of Mich.

[73] Assignee: Hutchinson, Paris, France

[21] Appl. No.: 993,836

[22] Filed: Dec. 21, 1992

[51] Int. Cl.$^5$ ............................ F16B 7/00; F16C 27/00
[52] U.S. Cl. ...................... 403/349; 403/348; 403/226; 403/225; 267/141
[58] Field of Search ............... 403/349, 348, 225, 226, 403/227, 326; 267/141, 141.4, 153

[56] References Cited

U.S. PATENT DOCUMENTS

| | | | |
|---|---|---|---|
| 4,503,292 | 3/1985 | Johnson | 403/348 |
| 4,632,594 | 12/1986 | Del Tufo et al. | 403/348 |
| 4,784,046 | 11/1988 | Gautier | 403/348 |
| 4,906,147 | 3/1990 | Friesinger | 403/349 |

OTHER PUBLICATIONS

1989 Resident Engineer's Review, "Fuel System, Automatic Transmission Cooler Lines & P/T Isolation", Chassis Engineering, Jun. 1988.

*Primary Examiner*—Randolph A. Reese
*Assistant Examiner*—Anthony Knight
*Attorney, Agent, or Firm*—Larson and Taylor

[57] ABSTRACT

A double locking connection device is provided between two sheet metal components to press the two components together and to prevent them from pivoting about an axis. A first component includes at least one arc-shaped key-hole having a) a first arched zone of a first width, a second arched zone following the first arched zone and having a second width smaller than the first width, and a third zone arranged between the first and second and having a width which decreases progressively in a direction of rotation from the first width to not greater than the second width. The second component includes an elastic locking tab suitable for placement in the first arched zone and having a width slightly less than the first width but greater than the second width so that relative rotation of the two components results in the double locking thereof.

9 Claims, 2 Drawing Sheets

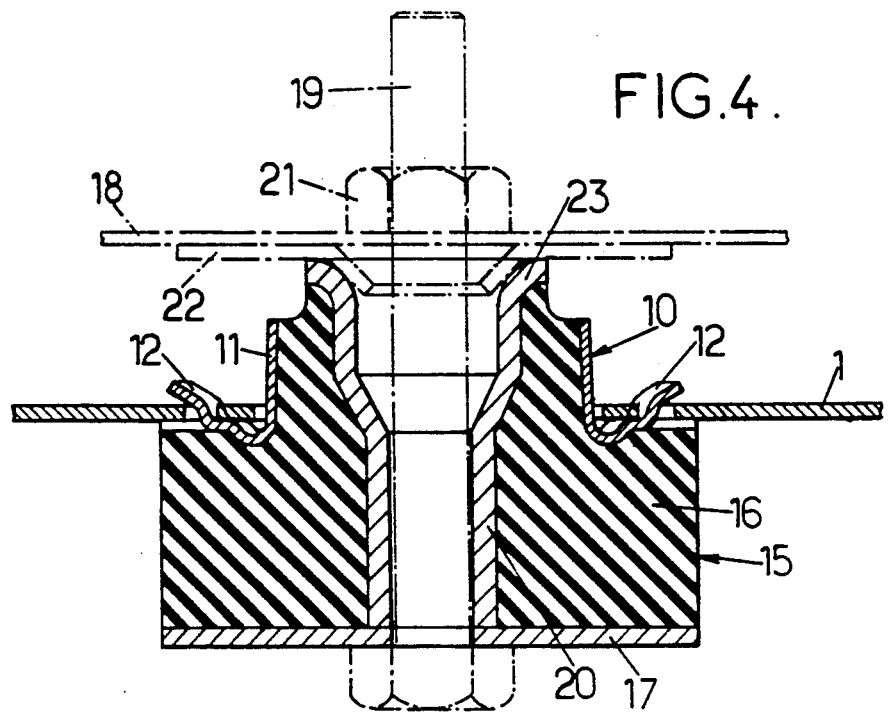
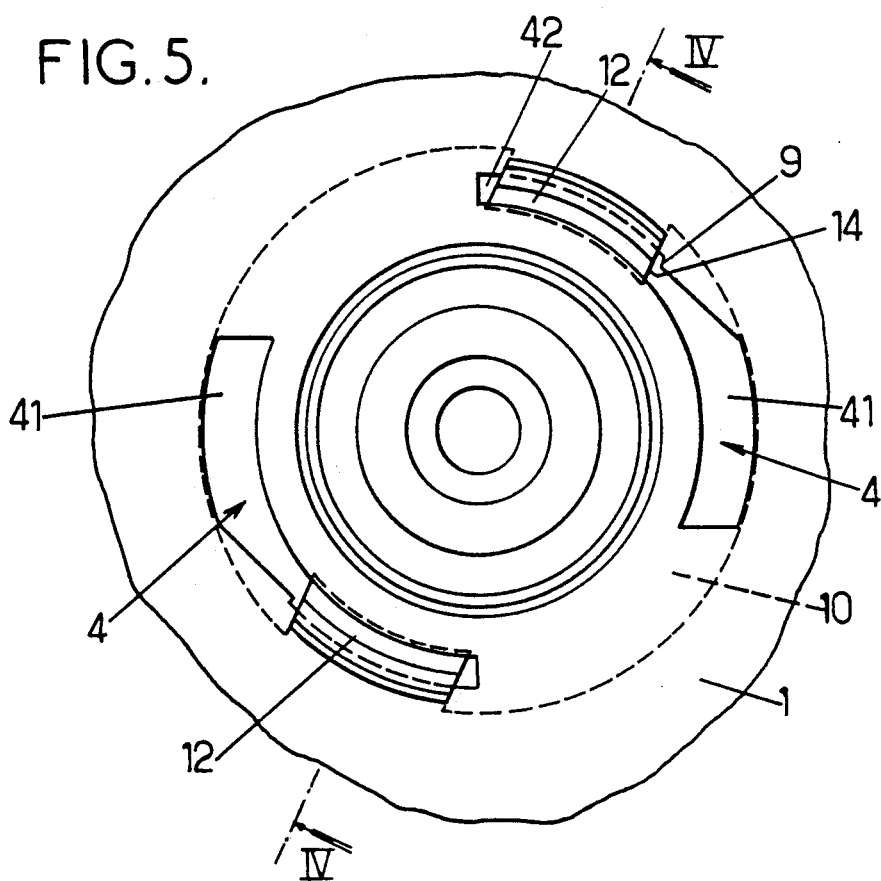

CONNECTION DEVICE BETWEEN TWO MECHANICAL COMPONENTS

The present invention relates to a connection device between two mechanical components, these components being made from sheet material and the said connection having to bring about, after its implementation, a double locking, namely pressing the two said components against one another along a common joining plane, preventing them, on the one hand, from moving away from this mutual pressing position, and on the other hand, from pivoting with respect to one another about an axis perpendicular to their joining plane.

The invention may find a particularly advantageous application for fastening an elastic suspension mount to the subframe of a motor vehicle, this subframe being able, for example, to carry the motorised propulsion unit and the front axle assembly, and several of these suspension mounts being intended to bring about an elastic connection between this subframe and the body of the vehicle. Usually, the outer rigid armature of such a suspension mount is fastened to the subframe by three or even four screw-nut systems, which is neither economical from the point of view of materials, nor from the point of view of assembly time. Next, a bolt is introduced into a tubular armature inside the suspension mount, so as to fasten it to the body of the vehicle.

The subject of the invention is a connection device making it possible to make the fastening of the armature of such a suspension mount to the subframe or to any other part of a vehicle and, in a more general fashion, the fastening of any two sheet material components to one another much more rapid and economical, where it is desired to avoid the use of numerous systems of the screw-nut type.

For this purpose, a connection device in accordance with the invention is characterised in that:
(a) one of the said components comprises at least one key-hole in the shape of an arc of a circle centered on the said axis and having:
  (aa) a first arched zone radially having a first width;
  (ab) a second arched zone radially having a second width, smaller than the said first width, this second zone, considered according to a predetermined direction of rotation about the said axis, following the first zone; and
  (ac) a third zone arranged between the first zone and the second zone, this third zone radially having a width which decreases progressively in the said predetermined direction of rotation, this width having, as its maximum value, that of the said first arched zone, and as its minimum value, a width which is at most equal to that of the second arched zone; and in that
(b) the other of the said components comprises at least one elastic locking tab suitable for engaging in the said first arched zone of the aforementioned key-hole when the two components are brought against one another, the said locking tab having, for this purpose, in the radial direction, a width which is slightly less than that of the said first arched zone, but greater than that of the said second arched zone, so that relative rotation of the said other component about the aforementioned axis, in the said predetermined direction of rotation, brigs about the abovementioned double locking of the two said components with respect to one another.

Advantageously, the said minimum value of the radial width of the third arched zone is less than that of the second arched zone, so as to constitute a locking notch for the said locking tab preventing it, when it has been introduced into the said second arched zone, from pivoting in the direction of rotation opposite the said predetermined direction of rotation, and from thus returning to the said first arched zone.

It can, for example, be arranged for one of the edges of the key-hole in the shape of an arc of a circle to have the shape of an arc of a circle in the said first zone and the shape of an arc of a circle of radius different from the previous one in the said second zone, these two arcs of a circle being connected by a ramp constituting the corresponding edge of the said third arched zone.

It will be further advantageous to arrange for the said locking tab to be obtained by cutting and folding the material sheet of the said other component and to be shaped so as to bear elastically against the said ramp of the third arched zone, during its rotation in the said predetermined direction of rotation.

According to an additional characteristic, the mean height of the space left between the lower surface of the locking tab and the plane of the material sheet constituting the corresponding component is slightly less than the thickness of the material sheet comprising the key-hole in the shape of an arc of a circle, which makes it possible to avoid any play between the two material sheets.

A device in accordance with the invention may further be characterised in that two key-holes in the shape of an arc of a circle are provided, and are preferably symmetrical with one another with respect to the said axis, as well as two elastic locking tabs arranged with respect to one another in the same relative position as the said key-holes, so as to be able each and respectively to engage simultaneously in the first arched zone of the said key-holes when the said connection is implemented.

In this case, it will be further advantageous to arrange for the said sheet material components to comprise a relative centering system arranged internally with respect to the said key-holes and having a circular opening on one of the said components and a collar of circular cross-section on the other component, suitable for engaging in the said opening when the said connection is implemented.

For example, the said circular opening is made in the component which comprises the said key-holes in the shape of an arc of a circle, and the said collar is made in the component which comprises the said locking tabs, which is more convenient to manufacture, because all the parts to be stamped are then situated in the same component, the other component being simply cut out.

The invention also relates to an elastic suspension mount, in particular intended to bring about an elastic connection between a subframe and a vehicle body, of the type comprising a mass of elastic matter bonded around a rigid through-tube and between an armature plate and a sheet material component, this sheet material component being rigidly connected to the said subframe by virtue of a connection device in accordance with that which has just been described, and the suspension mount being able to then be fastened to the said body by virtue of a bolt passing through the said tube and fastened to the body by a lock nut.

One embodiment of the invention will now be described by way of non-limiting example, with reference to the figures of the appended drawing in which:

FIG. 4 is a view in axial section along the line IV—IV of FIG. 5, of an elastic suspension mount fastening fastened to a subframe by virtue of a device in accordance with the present invention; and FIG. 5 is a view from above of the suspension mount of FIG. 4.

Figure 1:
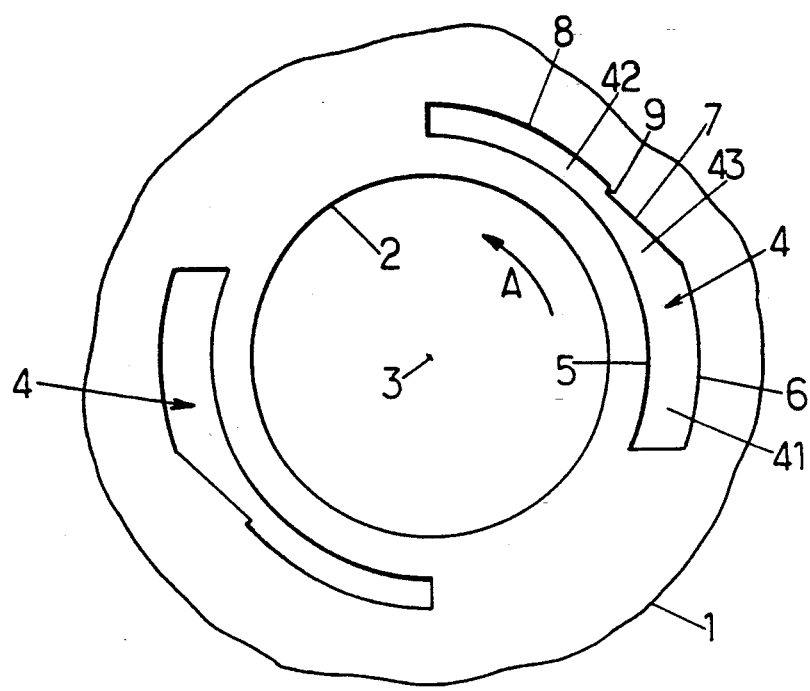
FIG. 1 is a plan view of part of the component which comprises the said key-holes in the shape of an arc of a circle.

A part of sheet metal component, for example out of steel, is shown in FIG. 1 and is referenced as 1; it comprises a circular opening 2 whose centre is referenced 3. This component comprises, on either side of this opening 2, two arched key-holes 4 which, advantageously, are identical and symmetrical with one another with respect to the centre 3. It is therefore necessary only to describe one of them, for example the one on the right in the drawing. The radially internal edge 5 of this key-hole is an arc of a circle concentric with the opening 2; its radially external edge comprises, according to the direction of rotation represented by the arrow A, an arc of a circle 6, a rectilinear ramp 7, and an arc of a circle 8, these two arcs of a circle also being concentric with the opening 2 but the arc of a circle 8 having a radius which is distinctly less than that of the arc of a circle 6. In this way, the key-hole in the shape of an arc of a circle 4 has a first arched zone 41 whose radial width is greater than that of the second arched zone 42; as for the third arched zone 43, its width progressively decreases along the direction of rotation A; its maximum radial width is equal to the radial width of the zone 41, and its minimum radial width is less than the width of the zone 42, so as to constitute a radial locking notch 9 at its front end.

Figure 2:
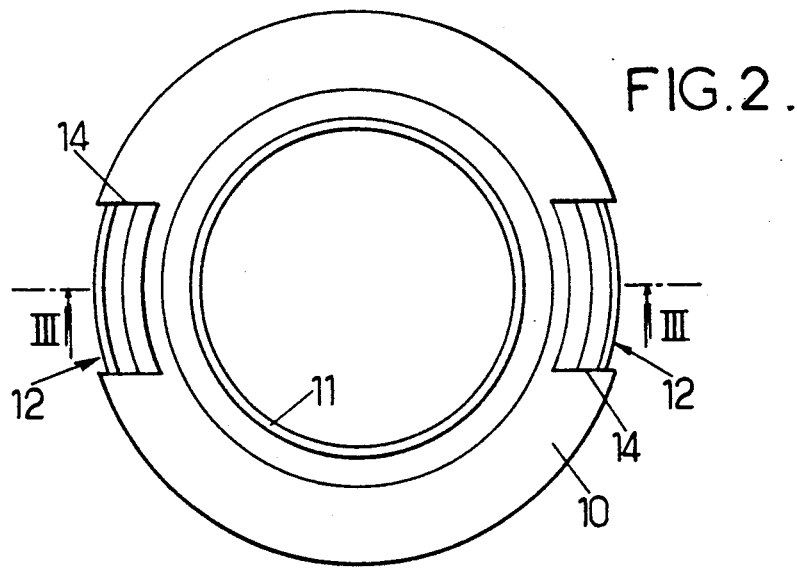
FIG. 2 is a plan view of the component which comprises the said elastic locking tabs.
Figure 3:
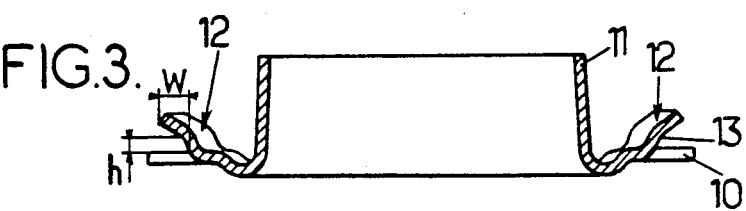
FIG. 3 is a sectional view along the line III—III of FIG. 2.

The other component of the connection is referenced as 10 in FIGS. 2 and 3. It has a collar 11 of circular cross-section, suitable for being engaged in the opening 2 of the component 1. On either side of this collar 11 two elastic locking tabs 12, which are advantageously identical and diametrically opposite one another are cut out from a metal sheet and are in a relative position such that they can engage respectively and simultaneously in the arched zones 41 of the key-holes 4 of the component 1 when the connection between the two components is implemented. For this purpose, the radial width W of these locking tabs, in a plane view, is of course slightly less than the radial width of the arched zones 41, whilst remaining greater than the radial width of the arched zones 42.

In this way, it is designed that after the collar 11 of the component 10 penetrates the opening 2 of the component 1 from below, and after the locking tabs 12 have been introduced into the zones 41 of the key-holes 4 in the shape of an arc of a circle, a relative rotation of the component 10 with respect to the component 1 in the direction of the arrow A will bring about slight elastic deformation of the locking tabs 12 radially inwardly, their lower surface 13 sliding on the ramps 7 of the arched zones 43. After going past the locking notches 9, the locking tabs 12 will return radially outwardly by penetrating the arched zones 42, their lower surface 13 coming to bear on the arc of a circle 8 and their corresponding edge 14 interacting with the notch 9 so as to prevent any rotation in the opposite direction, about an axis passing through the centre 3 and perpendicular to the joining plane of the two components.

Excellent mutual rigid connection of the components 1 and 10 is thus very rapidly obtained.

In relation to the elastic locking tabs 12, it may further be noted that it is advantageous to shape them such that the mean height h of the space left between their lower surface 13 and the upper plane of the plane part of the component 10 is slightly less than the thickness of the metal sheet which constitutes the component 1 (see FIG. 3). In this way, after assembling them, the components 1 and 10 will be slightly pressed against one another, due to the elasticity of the locking tabs 12, which will avoid any play which would generate noise and wear, between these two components.

A connection device such as that which has just been described can advantageously be used to fasten, to the subframe of a motor vehicle, elastic suspension mounts intended to bring about an elastic connection between this subframe and the body; it could, for example, relate to a subframe to which the motorised propulsion unit and the front axle assembly of the vehicle are fastened.

Such an elastic suspension mount has been shown in FIG. 4, and is designated by the reference 15. This suspension mount comprises a mass of elastic material 16, for example an elastomer, bonded between an outer armature plate 17 and a sheet metal component 10, which could be precisely that of FIGS. 2 and 3. The metal sheet constituting the subframe is cut out in accordance with the representation of FIG. 1 and has been referenced as 1. It is therefore very easy and economical to fasten such an elastic suspension mount 15 to the subframe 1 of the vehicle, by proceeding as indicated above so as to connect the component 10 rigidly to the component 1. When this suspension mount has been fastened to the metal sheet 1, it can be fastened to the body 18 of the vehicle in a conventional manner, by virtue of a single bolt 19, which passes through a rigid axial through-tube 20 of the suspension mount 15, around which the elastic mass 16 is also bonded, this tube constituting an armature inside the suspension mount. The bolt 19 is clamped to the body 18 by a nut 21, and a washer 22 with a conical hole is interposed between the metal sheet 18 and the flared end 23 of the tube 20, and this is to avoid this end, which serves as a stop and which therefore receives the clamping force of the nut, deforming the metal sheet 18 after a time.

FIG. 5 is a view from above of the assembly thus produced, the bolt 19, the nut 21, the metal sheet 18 and the washer 22 having been removed.

The invention thus makes it possible to avoid the usual use of three or four screw-nut assemblies for fastening the suspension mount 15 to the subframe 1. The connection device of the invention allows an extremely rapid and economical fastening, whilst ensuring the same security as a conventional screw and nut system.

According to the above disclosed example, it has been supposed that the two said components were made out of a sheet metal such as steel. It must however be stated that one could also use any convenient plastic material in place of metal. It is also possible to press or hammer the locking tabs 12 against the component 1 if necessary, after completion of the above disclosed mounting.

We claim:

1. An elastic suspension mount for providing an elastic connection to a vehicle body comprising:
   a subframe component to be attached to the vehicle body;
   a sheet metal component;
   an armature plate;
   a rigid through-tube extending from said armature plate and through said sheet metal component;
   a mass of elastic material bonded around said through-tube and between said sheet metal component and said armature plate;
   a connection means between said subframe component and said sheet metal component for locking said components against one another along a common joining plane and against rotation with respect to an axis perpendicular to the joining plane, said connection means being effected by a relative rotation of said components in a predetermined direction of rotation about the axis and including
   (a) in one of said components, at least one key-hole in a shape of an arc of a circle centered on the axis and having
      a first arched zone radially having a first width,
      a second arched zone radially having a second width smaller than the first width, said second zone following said first zone in the direction of rotation, and
      a third zone arranged between said first zone and said second zone, said third zone having a width which decreases progressively in the direction of rotation from a maximum equal to the width of said first zone to a minimum which is at most equal to the width of said second zone, and
   (b) the other of said components having at least one elastic locking tab suitable for engagement in said first zone as said components are brought against one another, said locking tab having a width in a radial direction which is slightly less than the width of said first zone but greater than the width of said second zone so that relative rotation of said components about the axis in the direction of rotation effects the locking of said components to one another; and
   a bolt and nut, said bolt passing through said through-tube and the vehicle body so that said bolt and nut attach said sheet metal component to the vehicle body.

2. A suspension mount according to claim 1, in which the minimum value of the radial width of the third zone is less than that of the second arched zone, so as to constitute a locking notch for said locking tab preventing said locking tab, when said locking tab has been introduced into said second arched zone, from pivoting in the direction of rotation opposite the predetermined direction of rotation opposite the predetermined direction of rotation, and from thus returning to said first arched zone.

3. A suspension mount according to claim 2, in which the key hole in the shape of an arc of a circle has a first edge portion in the shape of an arc of a circle in said first zone and a second edge portion in the shape of an arc of a circle of radius different from said first edge portion in said second zone, these two edge portions being connected by a ramp constituting a corresponding third edge portion of said third zone.

4. A suspension mount according to claim 3, in which said locking tab is obtained by cutting and folding a material sheet of said other component and is shaped so as to bear elastically against said ramp of the third zone during rotation of said locking tab in the predetermined direction of rotation.

5. A suspension mount according to claim 4, in which a mean height of a space left between a lower surface of the locking tab and an upper plane of a material sheet constituting the one of said components is slightly less than the thickness of the material sheet comprising the other of said components having said key-hole in the shape of an arc of a circle.

6. A suspension mount according to claim 1, in which two key-holes in the shape of an arc of a circle are provided in the other component and are preferably symmetrical with one another with respect to the axis, and in which as well two elastic locking tabs are arranged with respect to one another in the same relative position as the two said key-holes so as to be able to each and respectively to engage simultaneously in the first arched zone of said key-holes when the connection is implemented.

7. A suspension mount according to claim 6, in which said connection means comprises a relative centering system arranged internally with respect to said key-holes and having a circular opening on one of said components and a collar of circular cross-section on the other of said components suitable for engaging in said opening when the connection is implemented.

8. A suspension mount according to claim 7, in which said circular opening is made in said one component which comprises said key-holes in the shape of an arc of a circle, and said collar is made in said other component which comprises the said locking tabs.

9. A suspension mount according to claim 1, wherein said sheet material is a sheet metal.

* * * * *